(12) United States Patent
Huang et al.

(10) Patent No.: US 10,216,500 B2
(45) Date of Patent: Feb. 26, 2019

(54) METHOD AND APPARATUS FOR SYNCHRONIZATION ANNOTATION

(75) Inventors: Yi Huang, Cupertino, CA (US); David Leibs, San Mateo, CA (US); Peter Kessler, Palo Alto, CA (US)

(73) Assignee: Oracle International Corporation, Redwood City, CA (US)

( * ) Notice: Subject to any disclaimer, the term of this patent is extended or adjusted under 35 U.S.C. 154(b) by 1066 days.

(21) Appl. No.: 13/371,383

(22) Filed: Feb. 10, 2012

(65) Prior Publication Data

US 2013/0212568 A1 Aug. 15, 2013

(51) Int. Cl.
*G06F 8/41* (2018.01)
*G06F 8/52* (2018.01)

(52) U.S. Cl.
CPC ............... *G06F 8/458* (2013.01); *G06F 8/44* (2013.01); *G06F 8/47* (2013.01); *G06F 8/52* (2013.01)

(58) Field of Classification Search
CPC .......... G06F 8/47; G06F 9/45516; G06F 8/44; G06F 8/52; G06F 8/443
USPC ....................................................... 717/146
See application file for complete search history.

(56) References Cited

U.S. PATENT DOCUMENTS

| | | | |
|---|---|---|---|
| 5,822,588 A * | 10/1998 | Sterling et al. | 717/131 |
| 6,353,925 B1 * | 3/2002 | Stata et al. | 717/112 |
| 7,117,496 B1 | 10/2006 | Ramesh et al. | |
| 2005/0155028 A1 * | 7/2005 | Park | G06F 8/41 717/166 |
| 2006/0259487 A1 * | 11/2006 | Havens | G06F 21/51 |
| 2009/0055810 A1 * | 2/2009 | Kondur | G06F 9/5027 717/140 |
| 2010/0205580 A1 * | 8/2010 | McAllister et al. | 717/106 |

(Continued)

OTHER PUBLICATIONS

Balzer et al., "Can aspects implement contracts?" In N. Guelfi and A. Savidis, editors, *Rapid Integration of Software Engineering Techniques*, vol. 3943 of Lecture Notes in Computer Science, pp. 145-157; Springer Berlin / Heidelberg, 2006 (13 pages).

(Continued)

*Primary Examiner* — Li B. Zhen
*Assistant Examiner* — Bradford F Wheaton
(74) *Attorney, Agent, or Firm* — Martine Penilla Group, LLP

(57) ABSTRACT

Methods and system for providing synchronization of a multi-threaded application includes analyzing a source file of the application to identify one or more synchronization annotations contained therein, wherein the synchronization annotations are defined using declarative statements. One or more synchronization annotation processors are identified and invoked for processing the one or more synchronization annotations identified in the source file so as to generate code files. The source file is compiled to generate one or more class files by compiling the procedural code within the source file to generate one or more class files, and compiling the code files to generate the one or more class files. The class files associated with the code files are used by the multiple threads during execution of the application to arbitrate access to methods and data manipulated by classes within the class files associated with the procedural code.

14 Claims, 13 Drawing Sheets

(56) References Cited

U.S. PATENT DOCUMENTS

2011/0197174 A1* 8/2011 Wu et al. .................. 717/104

OTHER PUBLICATIONS

R. Behrends, "Designing and Implementing a Model of Synchronization Contracts in Object-Oriented Languages" PhD thesis, Michigan State University, East Lansing, Michigan USA, Dec. 2003. (184 pages).
Behrends et al., "The Universe Model: An Approach for Improving the Modularity and Reliability of Concurrent Programs," In Proc. FSE'00: ACM SIG-SOFT 8th Intl. Symp. Foundations of Softw. Eng., pp. 20-29, San Diego, CA, USA, Nov. 2000. ACM. (10 pages).
Behrends et al., "A Component-Oriented Model for the Design of Safe Multi-threaded Applications," In Proc. of the ACM STGSOFT international Symposium on Component-Based Software Engineering (CBSE'05), 2005. (16 pages).
Betin-Can et al., "Verifiable concurrent programming using concurrency Controllers," In Proc. ASE '04: 19th IEEE Intl. Conf. Automated Softw. Eng., pp. 248-257, Lawrence, KA, USA, Sep. 2004. IEEE Computer Society. (10 pages).
Cascaval et al., "Software transactional memory: Why is it only a research toy?" *Queue*, 6(5):40-46, Nov. 2008. (7 pages).
Damron et al., Hybrid transactional memory. In ASPLOS-XII: *Proc. of the 12th international conference on Architectural support for programming languages and operating systems*, pp. 336-346, New York, NY, USA, 2006. ACM. (11 pages).
Deng et al., "Invariant-based specification, synthesis, and verification of synchronization in concurrent programs." In *Proc. of the IEEE International Conference on Software Engineering* (ICSE'02), 2002. (11 pages).
Dinning, "A survey of synchronization methods for parallel computers," *Computer*, 22:66-77, Jul. 1989. (12 pages).
Fich et al., "On the inherent weakness of conditional synchronization primitives" In *Proceedings of the twenty-third annual ACM symposium on Principles of distributed computing*, PODC '04, pp. 80-87, New York, NY, USA, 2004. ACM. (19 pages).
Fleiner et al., "Fair multi-branch locking of several locks." In Proc. ICPDCS '97: *Intl. Conf. Parallel and Distributed Computing Systems*, pp. 537-545, Washington, DC, USA, Oct. 1997. (9 pages).
Fleming et al. "Separating synchronization concerns with frameworks and generative programming". Technical Report MSU-CSE-06-34, Michigan State University, East Lansing, Michigan, 2006. (22 pages).
Graunke et al. "Synchronization algorithms for shared-memory multiprocessors". *Computer*, 23:60-69, Jun. 1990. (10 pages).
Haller et al., "Scala actors: Unifying thread-based and event-based programming". *Theor. Comput. Sci.*, 410:202-220, Feb. 2009. (37 pages).
Harris et al., "Language support for lightweight transactions". In *Proc. of the ACM SIGPLAN Conference on Object-Oriented Systems, Languages, and Applications (OOPSLA'2003)*, 2003. (15 pages).
Harris et al., "Composable memory transactions". In *Proceedings of the tenth ACM SIGPLAN symposium on Principles and practice of parallel programming*, PPoPP '05, pp. 48-60, New York, NY, USA, 2005. ACM. (13 pages).
Haustein et al., "JAC: declarative java concurrency," Research articles. *Concurr. Comput. : Pract. Exper.*, 18(5):519-546, 2006. (28 pages).
J.W. Havender, "Avoiding deadlock in multitasking systems". *IBM Systems J.*, 7(2):74-84, 1968. (11 pages).
Herlihy et al., "A flexible framework for implementing software transactional memory". In *Proceedings of the 21st annual ACM SIGPLAN conference on Object-oriented programming systems, languages, and applications*, OOPSLA '06, pp. 253-262, New York, NY, USA, 2006. ACM. (9 pages).

Herlihy et al., "Software transactional memory for dynamic-sized data structures," In PODC '03: *Proc. of the twenty-second annual symposium on Principles of distributed computing*, pp. 92-101, New York, NY, USA, 2003. ACM. (10 pages).
C. A. R. Hoare, "Monitors: An operating system structuring concept," *Communications of the ACM*, 17(10):549-557, Oct. 1974. (9 pages).
C. A. R. Hoare, "Communicating sequential processes," *Commun. ACM*, 21(8):666-677, 1978. (12 pages).
C. A. R. Hoare et al., "Towards a theory of parallel programming," London: Academic, 1972. (4 pages).
Huang et al., "A thread synchronization model for SIP servlet containers," In *Proc. IPTComm '09: 3rd Intl. Conf. Principles, Systems and Applications of IP Telecommunications*, pp. 1-12, Atlanta, GA, USA, 2009. ACM. (12 pages).
Huang et al., "On mechanisms for deadlock avoidance in SIP servlet containers," In *Proc. IPTComm '08: 2nd Intl. Conf. Principles, Systems and Applications of IP Telecommunications*, pp. 196-216, Heidelberg, Sep. 2008. Springer-Verlag. (22 pages).
Huang et al., "Prototyping synchronization policies for existing programs," In *Proc. ICPC'09: Intl. Conf. Program Comprehension*, pp. 289-290. IEEE Computer Society, 2009. (2 pages).
Huang et al., "Contract-based synchronization of IP telecommunication services: A case study," In *the Fifth International Conference on COMmunication System softWAre and middlewaRE*. ACM, 2011. (12 pages).
Kiczales et al., "An overview of aspectJ," In *J. Knudsen, editor, ECOOP 2001 Object-Oriented Programming*, vol. 2072 *of Lecture Notes in Computer Science*, pp. 327-354. Springer Berlin / Heidelberg, 2001. (28 pages).
Kienzle et al., "AOP: Does it make sense? the case of concurrency and failures," In B. Magnusson, editor, *ECOOP 2002 Object-Oriented Programming*, vol. 2374 *of Lecture Notes in Computer Science*, pp. 113-121. Springer Berlin / Heidelberg, 2006. (25 pages).
M. F. Kilian, "A conditional critical region pre-processor for C based on the owicki and gries scheme," *SIGPLAN Not.*, 20:42-56, Apr. 1985. (15 pages).
Klein et al., "STM versus lock-based systems: an energy consumption perspective," In *Proceedings of the 16th ACM/IEEE international symposium on Low power electronics and design*, ISLPED '10, pp. 431-436, New York, NY, USA, 2010. ACM. (6 pages).
Larus et al., "Transactional memory," *Commun.* ACM, 51(7):80-88, 2008. (2 pgs).
D. Lea, "Concurrent Programming in Java," Addison—Wesley, second edition, 2000. (3 pages).
Lieberherr et al., "Aspect-oriented programming with adaptive methods," Commun. ACM, 44:39-41, Oct. 2001. (3 pages).
Luchangco et al., "Transaction synchronizers," In 2005 *Workshop on Synchronization and Concurrency in Object Oriented Languages (SCOOL'05)*, Oct. 2005. held at OOPSLA '05. (6 pages).
Magee et al., "Concurrency: State Models and Java Programming," John Wiley and Sons, second edition, 2006. (2 pages).
T. Mens et al., "Separation of concerns for software evolution," *Journal of Software Maintenance*, 14(5):311-315, 2002. (5 pages).
Popovici et al., "Dynamic weaving for aspect-oriented programming," In *Proceedings of the 1st international conference on Aspect-oriented software development*, AOSD '02, pp. 141-147, New York, NY, USA, 2002. ACM. (7 pages).
M. C. Rinard, "Effective fine-grain synchronization for automatically parallelized programs using optimistic synchronization primitives," *ACM Trans. Comput. Syst.*, 17:337-371, Nov. 1999. (12 pages).
S. Rugaber et al., "The interleaving problem in program understanding," *Reverse Engineering, Working Conference on*, 0:166, 1995 (10 pages).
Sarna-Starosta et al., "A model-based design-for-verification approach to checking for deadlock in multi-threaded applications," In *Proc. of 18th Intl. Conf. on Softw. Eng. and Knowledge Eng.*, 2006. (22 pages).

(56) References Cited

OTHER PUBLICATIONS

R. E. K. Stirewalt et al., "Safe and reliable use of concurrency in multi-threaded shared memory systems," In *Proc. of the 29th Annual IEEE/NASA Software Engineering Workshop*, 2005. (10 pages).
M. Wende et al., "Optimistic synchronization and transactional consistency," In *Proceedings of the $2^{nd}$ IEEE/ACM International Symposium on Cluster Computing and the Grid*, CCGRID '02, pp. 331-, Washington, DC, USA, 2002. IEEE Computer Society. (6 pages).
C. Zhang, "Flexsync: An aspect-oriented approach to java synchronization," In *Proceedings of the 31st International Conference on Software Engineering*, ICSE 09, pp. 375-385, Washington, DC, USA, 2009. IEEE Computer Society. (11 pages).
C. Zhang et al., "Externalizing java server concurrency with cal." In J. Vitek, editor, *ECOOP 2008 Object-Oriented Programming*, vol. 5142 *of Lecture Notes in Computer Science*, pp. 362-386. Springer Berlin / Heidelberg, 2008. (25 pages).
D. Zobel, "The deadlock problem: a classifying bibliography." *SIGOPS Oper. Syst. Rev.*, 17(4):6-15, 1983. (10 pages).

\* cited by examiner

Multi-threaded Program

- Constituents
  - Multiple threads
  - Shared objects

| | Concurrent threads | Shared objects |
|---|---|---|
| Dining Philosophers | philosophers | forks |
| Bounded Buffer | consumers, producers | buffer |
| Readers & Writers | readers, writers | data |
| Single-lane Bridge | cars | bridge |

Figure 4

METHOD AND APPARATUS FOR SYNCHRONIZATION ANNOTATION

BACKGROUND

Field of the Invention

The present invention relates to multi-threaded application, and more particularly, to synchronization of multi-threaded application.

Description of the Related Art

The continual trend for providing faster processing has led to the development of multi-threaded programs executing on multiple cores or multiple processors of a CPU. These multi-threaded programs may share access to common mutable objects. In order to ensure that multiple threads all execute properly without conflicts to the shared mutable objects one or more synchronization policies are implemented. The synchronization policies ensure that the activities of the multiple threads accessing shared mutable objects in memory are properly coordinated.

The need to properly synchronize multiple threads accessing shared mutable objects for a complex program becomes extra difficult, as the synchronization needs to address all aspects of the complex program. Insufficient synchronization can violate the program's safety by failing to properly monitor object usage, thereby leading to data corruption. Too much synchronization may lead to too much overhead, degrading the performance of the program as well as leading to deadlock or even starvation. To overcome the various disadvantages, highly customized synchronization policies have been developed for the multithreaded programs.

Historically, these highly customized synchronization policies have been developed using low-level primitives and have been tightly coupled to the primary procedural code of the programs. This leads to the mixing of the synchronization code with procedural code making the procedural code more obscure, greatly obstructing program comprehension and maintenance. The low-level primitives used in developing synchronization policies are prone to bugs making implementation of the synchronization policies difficult. As a result, it is difficult to ensure correctness and to maintain these policies, especially when the procedural code evolves. Oftentimes, there is more synchronization code than procedural code in the program due to the synchronization policy having to keep up with the complexities of the program. Due to the tight coupling, when the procedural code evolves, the synchronization policies also need to be updated to keep up with the procedural code. This results in negative distraction for a programmer as the programmer spends more time in trying to identify the synchronization logic within the program and implementing updates to the synchronization logic than developing the procedural code.

The mixing of the synchronization code with the procedural code has other disadvantages. It is hard to extend an existing program with new features as the tight coupling of the synchronization code with the procedural code greatly obscures a programmer's intention. Synchronization hazards are easy to introduce and hard to detect and eliminate, resulting in very fragile programs. In order to avoid such hazards, a programmer often has to carefully parse and comprehend the various methods within the program in order to understand the intention of the program and the synchronization logic, which is tedious and time-consuming as the synchronization code associated with the logic is spread throughout the program. As a result, a change to one method can produce negative side effects to the synchronization code that might break down other methods. Such side effects are difficult to detect. The low-level primitives used for implementing the synchronization policies require the programmer to have in-depth knowledge of the language used, which is neither standard nor intuitive, and synchronization policy that is to be implemented. procedural code It would therefore be advantageous to find ways to substitute low-level synchronization details with more robust high-level synchronization detail so that they can be implemented at different levels of abstraction. It would be advantageous to provide a flexible and seamless approach to implementing changes to the program without having to plan comprehensive synchronization strategies.

It is in this context that the embodiments of the invention arise.

SUMMARY

Embodiments of the present invention describe methods and apparatus that provide synchronization of a multi-threaded application executing on multiple threads. One or more synchronization annotations are defined for procedural code in a source file of the application, using high-level declaratives. One or more annotation processors are identified to process the synchronization annotations separately from the procedural code and to generate a set of code files that encapsulate the synchronization requirements for various logics specified within the source file. A compiler is used to compile the procedural code in the source file and the code files to generate a set of class files. These class files are used by the multiple threads during execution of the application.

The embodiments provide a way to separate the functional logic from synchronization logic within the source file enabling implementation of the functional logic and synchronization logic at different levels of abstraction. Typically, the functional logic tends to be operational and low-level. The synchronization annotations are defined using Java annotation technique that uses high-level declaratives. The separation makes it possible to implement the procedural code and synchronization annotation independently. Further, using this approach it is easier to develop various synchronization strategies for the same procedural code without changing the procedural code and vice versa, making this a more flexible and optimized solution. The compiler is relied on to glue the functional logic and the synchronization logic together at compile time. The embodiments precisely capture a programmer's intention by substituting operational and low-level synchronization details with declarative and high-level synchronization annotations.

The embodiments of the invention leverages existing annotation capacity of the Java compiler to specify synchronization concerns and for generating synchronization policy details to address the synchronization concerns. There are two essential parts to this invention. The first essential part is generating a set of predefined synchronization annotations using high-level declaratives that describe a program's synchronization concerns. The second essential part is to develop one or more synchronization annotation processors (SAPs) for generating details of one or more synchronization policies using the synchronization concerns expressed in the synchronization annotations. Some exemplary synchronization concerns include (but are not limited to) specifying what objects a thread needs to access during execution of the program and what conditions a thread expects to satisfy prior to entering a critical region. Specifications for such concerns may be provided by a programmer or provided by some design tool. The SAP is used to generate the details of a synchronization policy using a particular class of synchronization primitives based on the annotations of the program. The synchronization primitives may include any one or more of locks, events, or transactions. During the creation of the synchronization policies, the SAPs perform error checking, code optimization and one or more document creation that aid in comprehension and/or analysis. Thus, the current embodiments generate highly optimized and customizable synchronization code using Java compiler's existing annotation capacity that is standard, complete, flexible, well-known and fully supported.

It should be appreciated that the present invention can be implemented in numerous ways, such as, methods and apparatus. Several inventive embodiments of the present invention are described below.

In one embodiment, a method for providing synchronization of a multi-threaded application executing on multiple threads for providing access to a shared object, is disclosed. The method includes analyzing a source file of the application to identify a synchronization annotation contained therein. The source file includes procedural code of the application and the synchronization annotation. The synchronization annotation is defined using declarative statements that are different from procedural statements implementing business logic within the procedural code of the source file. A synchronization annotation processor is identified for processing the synchronization annotation identified in the source file wherein the synchronization annotation processor is configured to process one or more kinds of synchronization annotation. The identified synchronization annotation processor is invoked for processing the synchronization annotation to generate one or more synchronization code. The source file is compiled to generate one or more class files, wherein the compiling includes compiling the procedural code within the source file to generate one or more class files; processing the synchronization code to generate one or more code files; and compiling the one or more code files to generate one or more class files. The class files associated with the code files are used by the multiple threads during execution of the multi-threaded application to arbitrate access to methods and data manipulated by classes within the class files associated with the procedural code.

In another embodiment of the invention, a computer system for providing synchronization of an multi-threaded application executing on multiple threads is provided. The system includes a compiler configured to analyze a source file of the application to identify one or more synchronization annotations contained within. The source file includes procedural code and synchronization annotations. The synchronization annotations are defined by one or more declarative statements that are different from the procedural statements implementing business logic within the procedural code. The compiler is further configured to examine the source file to identify declarations contained therein; collect information related to the declarations, wherein the collected information identifies attributes of the declaration; analyze the synchronization annotations encountered in the source file using the collected information related to the declarations. The analysis of the synchronization annotations identify attributes that are used to determine appropriate synchronization annotation processors for processing the synchronization annotations. The system also includes a plurality of synchronization annotation processors to process the synchronization annotations identified in the source file and generate one or more code files. The generated code files are returned to the compiler for further processing. The compiler is further configured to compile the procedural code of the source file to generate one or more class files. The class files associated with the procedural code and the code files are linked such that the class files associated with the code files are used by the multiple threads during execution of the multi-threaded application to arbitrate access to methods and data manipulated by classes within the class files associated with the procedural code.

Thus, the embodiments of the invention use standard, complete, flexible, well-known and fully supported annotation techniques and a set of customized annotation processors to define different synchronization strategies. These strategies can be implemented independent of the procedural code. The flexible and independent nature of these strategies makes it possible to reuse these strategies. The details within the synchronization strategies generated by the annotation processors based on the synchronization requirements vary depending on the synchronization policy and the synchronization primitives used. By making use of the source-related information collected by the compiler, an annotation processor generates highly optimized code.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood with reference to the following description taken in conjunction with the accompanying drawings.

FIG. 4 illustrates constituents of an overly simplified multi-threaded program illustrating the objects shared by multiple threads, in one embodiment of the invention.

DETAILED DESCRIPTION

Broadly speaking, the embodiments of the present invention include methods and apparatus for providing synchronization of a multi-threaded application that is scheduled for executing on multiple threads and provides access to a shared object. One or more synchronization annotations are provided within a source file. These synchronization annotations are processed using annotation processors to generate synchronization code. The synchronization code is processed to generate code files, which are compiled to generate class files. The class files for the synchronization code are linked with the class files associated with the procedural code such that class files associated with the code files are used by the multiple threads during execution of the application.

The synchronization annotations are provided as high-level declarative statements. These declarative statements capture a programmer's true intentions. The high-level declaratives allow separation of synchronization logic from the functional logic thereby permitting a programmer to implement the functional and synchronization logics on different levels of abstraction. Further, the synchronization annotations can be extended to generate additional synchronization policies independently without having to change the procedural code. Such flexibility makes it possible to reuse the various synchronization strategies. The high-level declaratives specify what needs to be synchronized leaving the details of how to synchronize to an independent synchronization service available to a compiler.

This is different from the traditional synchronizations that used operational low-level primitives. The low-level primitives were prone to bugs because of their subtle and implicit semantics, such as a "while" loop, which introduces invalid conditions if not used properly. Further, these low-level primitives are coupled with the procedural code of the application program obstructing comprehension and maintenance of the application program. The coupling also makes it hard to extend an existing program with new features. The programs produced by these low-level primitives are brittle due to the fact that synchronization hazards are easily introduced but are very difficult to detect and eliminate without breaking the procedural code.

Figure 1:
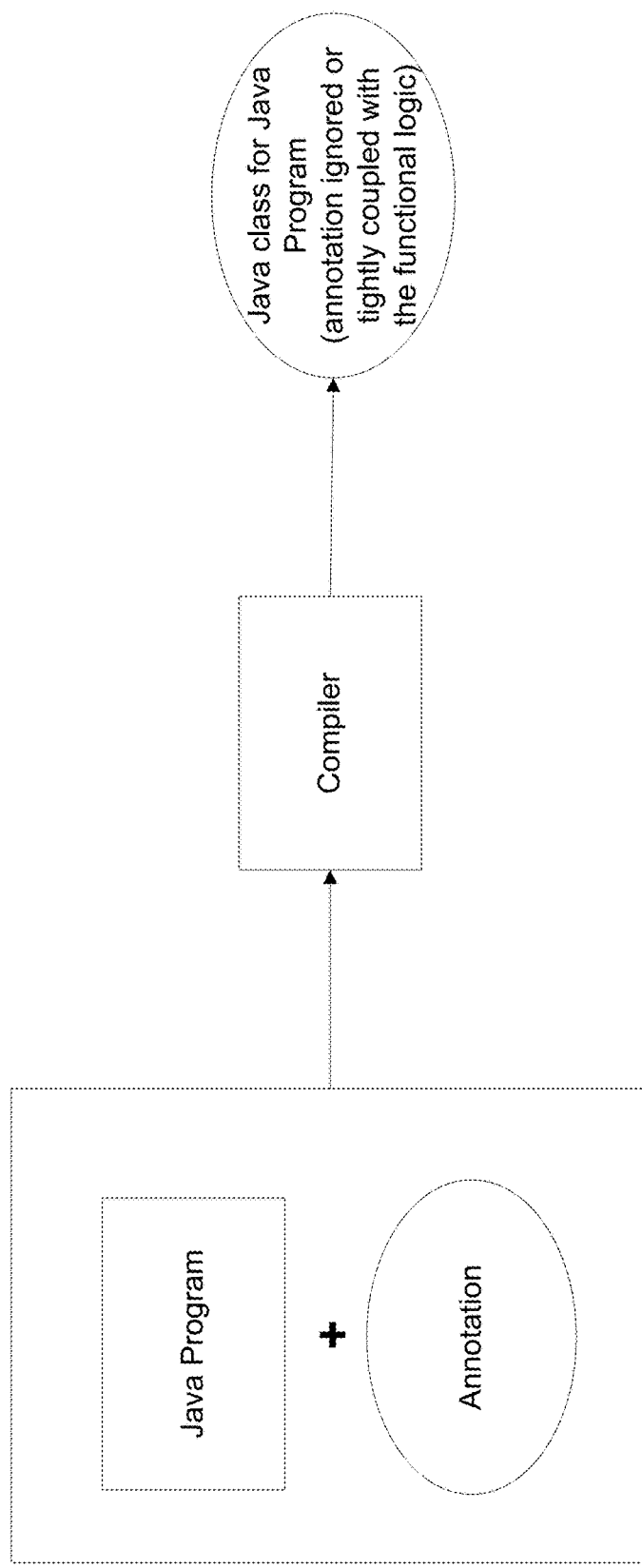
FIG. 1 illustrates a simplified overview of a process used to generate class files for an application in a traditional environment, in one embodiment of the invention.

With the brief overview of the current embodiment and the disadvantages of the traditional approach, embodiments of the invention will now be described with reference to the drawings. FIG. 1 illustrates a simplified overview of how traditional annotations were generated for multi-threaded programming. The multi-threaded program identifies constituents that enable execution of at least a portion of the multi-threaded program on multiple threads. FIG. 4 illustrates an overview of the constituents of a multi-threaded program. As illustrated, the constituents of multi-threaded program/application include multiple threads executing the application and one or more objects that are shared amongst the multiple threads. For instance, as illustrated in FIG. 4, for a "Dining Philosophers" application, philosophers represent the concurrent threads and the forks represent the shared objects. Similarly, for a single-lane bridge application, the concurrent threads are represented by cars and the shared object is the bridge. For a Bounded Buffer application, the concurrent threads are represented by consumers and producers and the shared object is the buffer.

Referring back to FIG. 1, traditional annotations are developed using Java program. A source file with a plurality of methods is written in Java program. Synchronization logic related to synchronization of one or more methods is designed and synchronization code is created to implement the synchronization logic using operational and low-level primitives. The synchronization (sync for short) logic is designed to address what shared resources are needed in a critical region and what conditions must be true to enter the critical region. Based on the required logic, primitives are selected for implementing appropriate protocol. For instance, a lock primitive may be selected to implement resource number and gate keeper protocols. Similarly, transactions primitives may be selected to implement protocols that detect and resolve conflicts. In the traditional approach of providing synchronization, the implementation of the appropriate protocols and implementation of the functional logic of the application are on the same level of abstraction. As a result, the same abstract programming language is used to implement both the functional logic and the synchronization logic. Due to the level of abstraction, the functional logic may be used to control the synchronization logic and vice versa. Consequently, it is hard to say which part of the application program is related to synchronization and which part is related to the functional logic. The functional logic and the synchronization logic are compiled using Java compiler to generate ".class" files. In some instances, depending on the way the annotations are defined, the compiler ignores the annotations. In other instances, the annotations are tightly coupled with the functional code resulting in class files that include code related to the annotations interspersed with the compiled functional code of the source file. Due to the tight coupling, it is hard to make changes to one without making changes to the other. Once a primitive and a protocol is selected, implemented and merged with functional logic, it is hard to change the protocol or the primitive at a later stage.

Figure 2A:
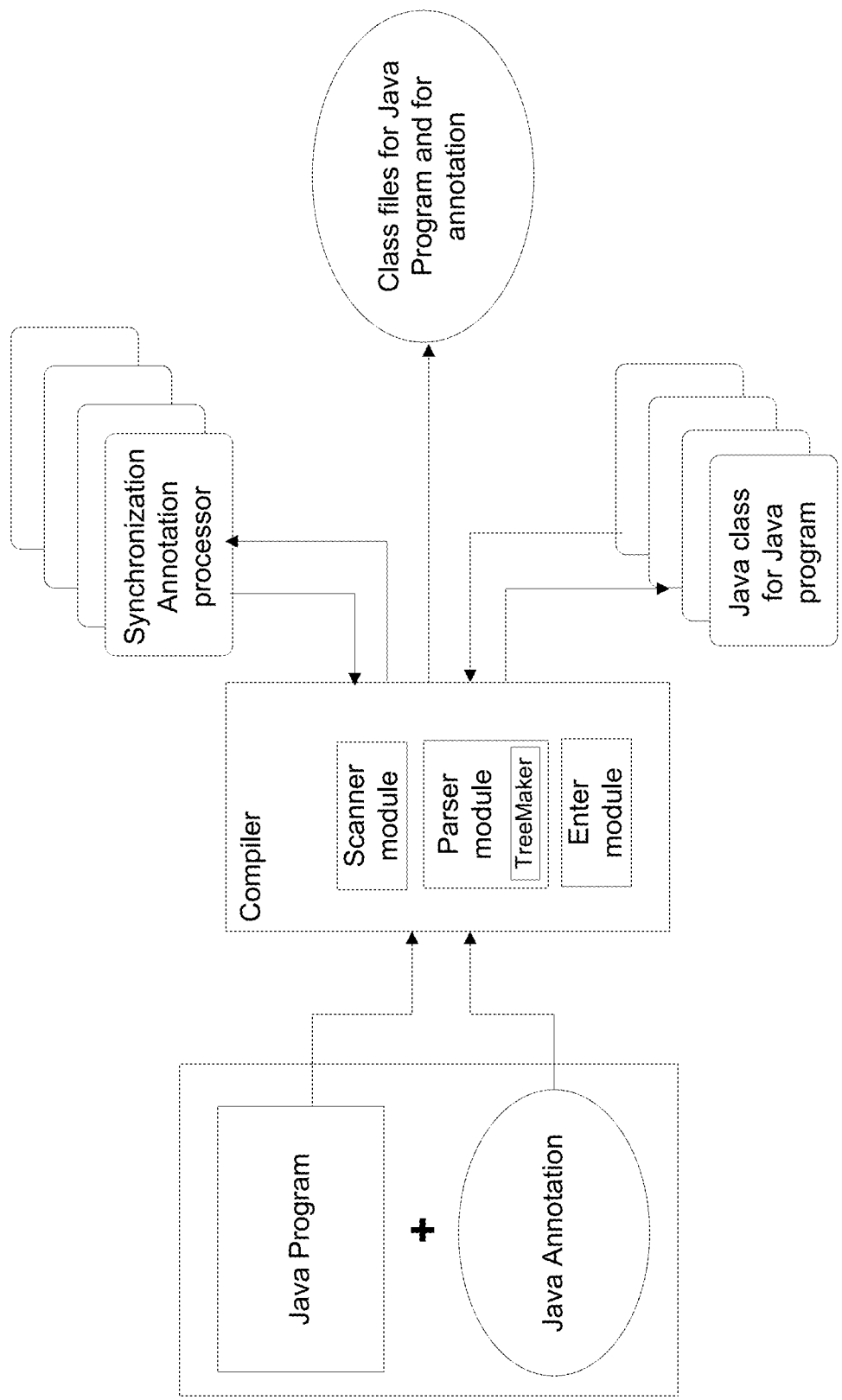
FIG. 2a illustrates a simplified overview of a system and process used for generating class files, in one embodiment of the invention.

In order to overcome the disadvantages of the traditional approach toward synchronization, the current embodiments describe alternate ways to provide synchronization. The fundamental idea is to separate the synchronization logic from the functional logic and relying on a compiler to bring the two together. Within the synchronization logic, the "what to synchronize" aspect is separated from the "how to synchronize" aspect. FIG. 1 illustrates a simplified overview of how traditional annotations were generated for multi-threaded programming. FIG. 2a illustrates a simplified overview of how annotations are generated using existing Java annotations for multi-threaded program, in one embodiment of the invention. As illustrated in FIG. 2a, Java annotations are used to specify high-level synchronization requirements for one or more methods within a Java program and a compiler is used to interpret the annotations and generate low-level synchronization details. A source file defining a plurality of methods is created using operative statements. The synchronization logic for providing synchronization to one or more methods in the source file is designed in a similar fashion as the one followed by the traditional approach, by specifying what shared resources are needed in a critical region and what conditions must be met (i.e. true) in order to enter a critical region. Unlike the traditional approach that uses low-level primitives, one or more synchronization annotations implementing the synchronization logic are defined for one or more methods of the source file using high-level declarative statements. These high-level declaratives address the "what needs to be synchronized" aspect leaving the "how to synchronize" aspect to the compiler.

Once a source file of the application program is developed and annotations defined, the program and the annotations are compiled using a compiler, such as a Java compiler. The compiler compiles the program and the annotations contained within. The compiler In one embodiment, the procedural code is written in Java program and the annotations are written using Java annotations that are defined as declarative statements. The compiler will parse the source file and recognize the annotation within the source file based on the declaratives. The compiler examines the declarations and collects information related to the declarations. The information collected identify attributes of the declarations. The compiler then searches and identifies an appropriate annotation processor, which is a separate piece of code, for processing the embedded annotation. A plurality of annotation processors are defined to process annotations with each of the annotation processor configured to process one or more kinds of synchronization annotations. The compiler chooses the appropriate annotation processor for processing the annotation based on the synchronization logic provided in the declarative statements. The annotation processor may or may not generate code depending on how the annotation is defined. If the annotation processor generates code during processing of the annotation, the code may or may not include additional annotations. If additional annotations are included in the generated code, then the compiler may identify additional annotation processors to process the additional annotations. The identified annotation processor(s) reads the annotation from the generated code and processes the annotation to generate code files. The annotation processor returns the code files to the compiler for further processing. The compiler then generates java class files for the procedural code in the source file and for the code files generated for the annotation. For a java program that includes an annotation, the compiler along with the annotation processor creates two class files—a class file for the procedural code portion of the source file, and a class file for the annotation portion of the source file. The compiler links the two class files together such that the class files associated with the code files are used by multiple threads during execution of multi-threaded application to arbitrate access to methods and data manipulated by the classes within the class files associated with the procedural code.

Figure 2B:
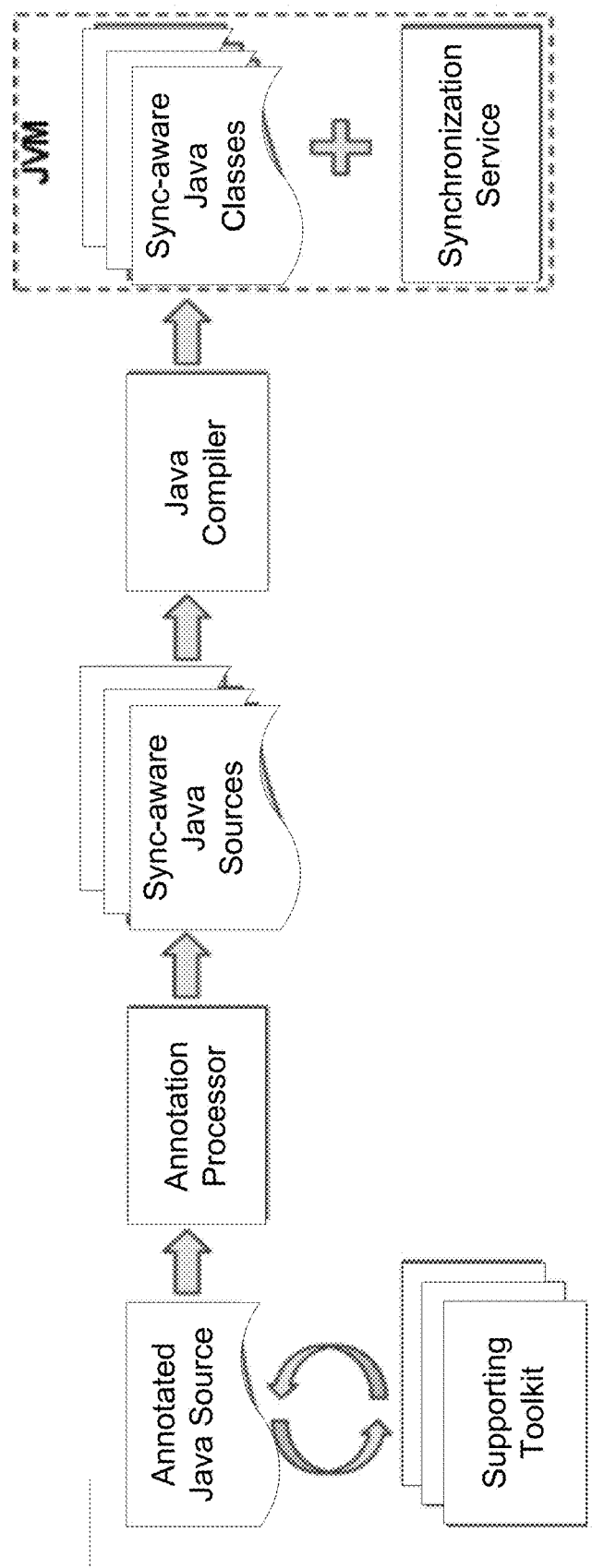
FIG. 2b illustrates the simplified process flow through an exemplary system for generating the class files for a source file having annotations, in one embodiment of the invention.

FIG. 2b illustrates a simplified overview of the various tools and modules used in processing the synchronization annotations and generating synchronization aware Java class files. A program supporting toolkit, such as Java toolkit, and existing Java annotation techniques, are used to review the methods within a source file and to determine the synchronization (or simply sync) requirements for the one or more methods. Once the sync requirements are determined for the one or more methods, sync logic is designed, and sync annotations are defined for each of the methods based on the sync logic. These sync annotations are provided within the source file using the Java annotation technique. The technique allows custom and compiler-recognizable metadata specifying synchronization annotations to be attached to the source code of the methods within the source file. The annotated Java source file is compiled using a compiler tool, such as a Java compiler. The Java compiler parses the source file, recognizes the declarative statements of the annotation embedded within and identifies an appropriate sync annotation processor (SAP) from a plurality of SAPs to process the sync annotation to generate sync code. The compiler hands the annotated java source file to the identified SAP to separately process the annotation. The SAP is a compiler plug-in that is specifically developed to translate the sync annotations to sync code. If the sync code includes additional annotations, additional SAPs may be identified to process the annotation. This process is recursive till the code files have been processed and are annotations-free. The SAP then transmits the sync-aware Java source file with the sync code to the Java compiler for compilation. At this stage, the sync-aware Java source file includes codes and no annotations. The Java compiler compiles the procedural code and the sync code within the sync-aware Java source file into one or more sync-aware Java class files. The class files associated with the sync code and the procedural code are linked together by the compiler. The sync-aware Java class files are used by a Java Virtual Machine (JVM) to provide arbitration to methods and data manipulated by classes within the class files of the procedural code during execution of the multi-threaded application. A synchronization service may be relied on by the JVM to provide the arbitration. In one embodiment, the generated sync code is built atop a high-level application programming interface, such as a Negotiator API. The goal of using this API service is to separate the "how to synchronize" aspect from "what to synchronize" aspect. The usage of the sync service to deliver the sync code provides the needed flexibility to reuse the sync strategies that were created to deal with complex sync requirements. The Negotiator API acts as an interface between the generated sync code and the sync service.

A brief overview of the role of the sync service in delivering the sync code will now be described. As mentioned, the Java compiler automatically compiles the classes for the sync code that the SAP generates, with the other classes of an application. A component, such as a Java archive package (JAR), required to execute the class files is automatically loaded by Java Virtual Machine (JVM). The JAR provides the sync service in delivering the synchronization to the threads. The sync service coordinates activities of multiple threads based on calls from negotiators executing on behalf of these concurrent threads. A negotiator API is implemented to respond to the calls from the negotiators. The sync service is responsible for evaluating conditions and for avoiding deadlocks and data races that might arise when competing for resources needed in the evaluation of certain conditions. The sync service can implement any sync protocol using any sync primitive. For instance, a class of lock-based sync service is created based on common sync protocols, including resource numbering, gatekeeper and a variant of a two-phase locking protocol. These sync services are interchangeable in terms of capability of scheduling thread activities while avoiding deadlocks and data races.

Figure 3A:
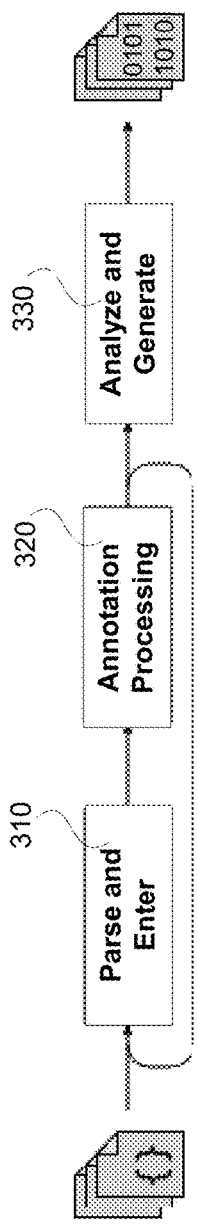
FIGS. 3A-3C illustrate overview of a process followed by a compiler during compilation of an annotated source file to generate class files, in one embodiment of the invention.
Figure 3B:
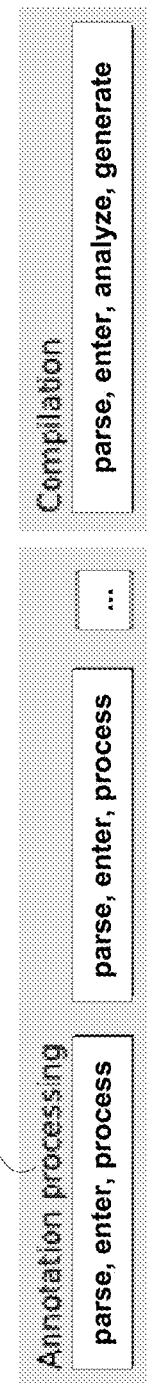
Figure 3C:
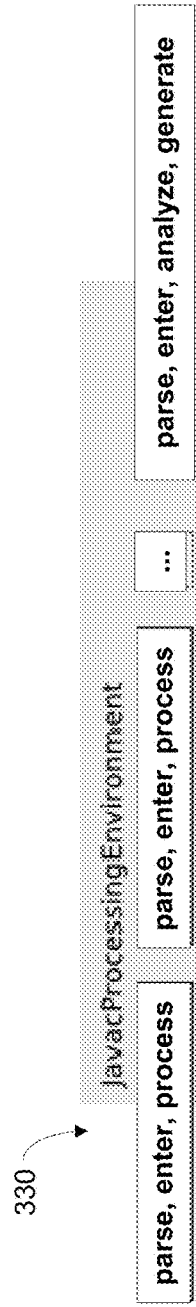

FIGS. 3A-3C illustrate a process followed for compiling a source file into a corresponding set of class files using annotation processors. The compiling of a source file into class files is an involved process. The compiling process can be generally divided into three stages. The compiling process is handled by a compiler, such as JavaCompiler class. It should be noted that, during compilation, different parts of source files may proceed through the compilation process at different rates, on an "as needed" basis. In the first stage, in one embodiment that is similar to Java class compilation, all the source files specified in a command line are read, parsed into syntax trees, and all externally visible definitions are entered into one or more of the compiler's symbol tables. In the next stage, all appropriate annotation processors are called. If any of the called annotation processors generate additional source or class files or annotations, the compilation process is restarted. This compilation process continues till no new files or annotations are created. In the final stage, the syntax trees created in the parsing stage are analyzed and translated into class files. During the course of analysis, if references to additional classes are found, the compiler will check the source and class path for these classes. If the class paths are found on the source path, the additional class files will be compiled. In one embodiment, the additional class files may not undergo annotation processing. This may be due to the fact that there are no annotations within the additional class files. In another embodiment, in the first stage, the compiler would examine the source file to identify declarations contained within, collect information related to the declarations. The collected information identify the various attributes associated with the declarations. In the second stage, all appropriate annotation processors are identified and called. If any of the called annotation processors generate additional source or class files or annotations, the compilation process is restarted. This compilation process continues till no new files or annotations are created. In the final stage, the synchronization annotations encountered in the source file are analyzed using the collected information and translated into class files. The various stages of compilation process will now be described in detail with references to FIGS. 3A-3C.

FIG. 3A illustrates the compilation process, in one embodiment of the invention. During the parse and enter stage 310, source files are processed for Unicode escapes and converted into a stream of tokens by a Scanner module within the compiler. The stream of tokens is read by a Parser module of the compiler, to create syntax trees. The parser module may use a TreeMaker module that relies on Java toolkit, such as JCTree, to generate the syntax trees. Each syntax tree is passed to an Enter module, which parses the syntax tree and enters symbols for all definitions encountered in the source file into a symbol tree. The parsing and entering is done before the compiler analyzes the syntax trees as the analysis may reference some of the symbols. At the end of the parse and enter stage 310, the syntax trees are ready for analysis by a compiler. In another embodiment, the compiler parses the source file and identifies the declaratives contained within the source file. The declaratives are easily identifiable due to the usage of high-level declarative statements. Upon identifying the declaratives, the compiler examines the declaratives and gathers information related to the declaratives. In one embodiment, the information may provide attributes that define the nature and type of the declarations so that appropriate annotation processors may be identified. The parsing and identifying is done before the compiler analyzes and processes the declaratives, as the analyzing and processing may require the gathered information for identifying of appropriate synchronization annotation processors.

The compiler then proceeds to the annotation processing stage 320, as illustrated in FIG. 3B. In one embodiment, the compiler relies on JavaProcessingEnvironment (JPE), a Java Toolkit, for processing the annotations. The annotation processing is a preliminary step before compilation of the source files into Java classes. The annotation process may involve a plurality of "parse, enter/examine, process" rounds, as shown in FIG. 3B. In the initial "parse, enter/ examine, process" round, the JPE parses and enters the source files, and then identifies and invokes appropriate annotation processors. After the initial round, if any of the annotation processors that are initially called to process the annotations, generate any new source files, class files or additional annotations that need to be compiled, then additional "parse, enter/examine, process" rounds are performed by the JPE.

Appropriate annotation processors for processing annotations are identified after the source files have been parsed and the declarative statements defining the annotations are determined. In order to avoid unnecessary processing overhead when no annotation processing is to be performed, the JPE executes "out of phase" to determine if there are any annotations for processing. The JPE is invoked after the source files that needs to be compiled, have been parsed and entered/examined. Upon determining there are annotations to be processed, the JPE determines whether any annotation processors need to be loaded and called. If any annotation processors are to be run to process the annotations, then the appropriate annotation processors are identified, loaded and run in a separate class loader. After an initial run of the annotation processors, the JPE determines if another round of annotation processing is required. Additional processing may be required if the initial processing of annotations generated code that included additional annotations or source files. If there is a need, then JPE identifies additional annotation processors, creates a new object, such as a JavaCompiler object, reads any newly generated source files that need to be parsed, and reuses any previously parsed syntax trees or gathered information. The syntax trees are entered into the symbol tables or the gathered information may be entered into appropriate tables for the new compiler instance, and annotation processors are called as necessary. This step is repeated until no more rounds of annotation processing are required. The JPE then releases the object so that the object can be used for the remainder of the compilation. When all necessary rounds are completed, the compilation of the source file is performed.

In the final stage of compilation, the source files are analyzed and class files generated, as illustrated in FIG. 3C. In the "Analyze and Generate" stage, the compiler proceeds to analyze the syntax trees that were parsed and entered in the "Parse and Enter" stage or relies on the gathered information to generate corresponding class files. During the analysis, the compiler may encounter classes that are required for successful compilation, which were not explicitly specified for compilation. Depending on the compilation options, the source path and class path are searched for such class definitions. If the definition is found in a class file, the class file will be read to determine the definitions in that class. If the definition is found in a source file, the source file will be automatically parsed, entered/examined and processed. The analyzing of the synchronization annotations and generation of class files is performed by the compiler using the symbol definitions in the symbol tables or the collected information. Once the class files are written out, the syntax trees, the symbols and collected information are no longer required. As a result, any references to these syntax trees, symbols or collected information are nulled out so as to allow the memory to be recovered by the garbage collector during subsequent garbage collection cycle.

Figure 5:
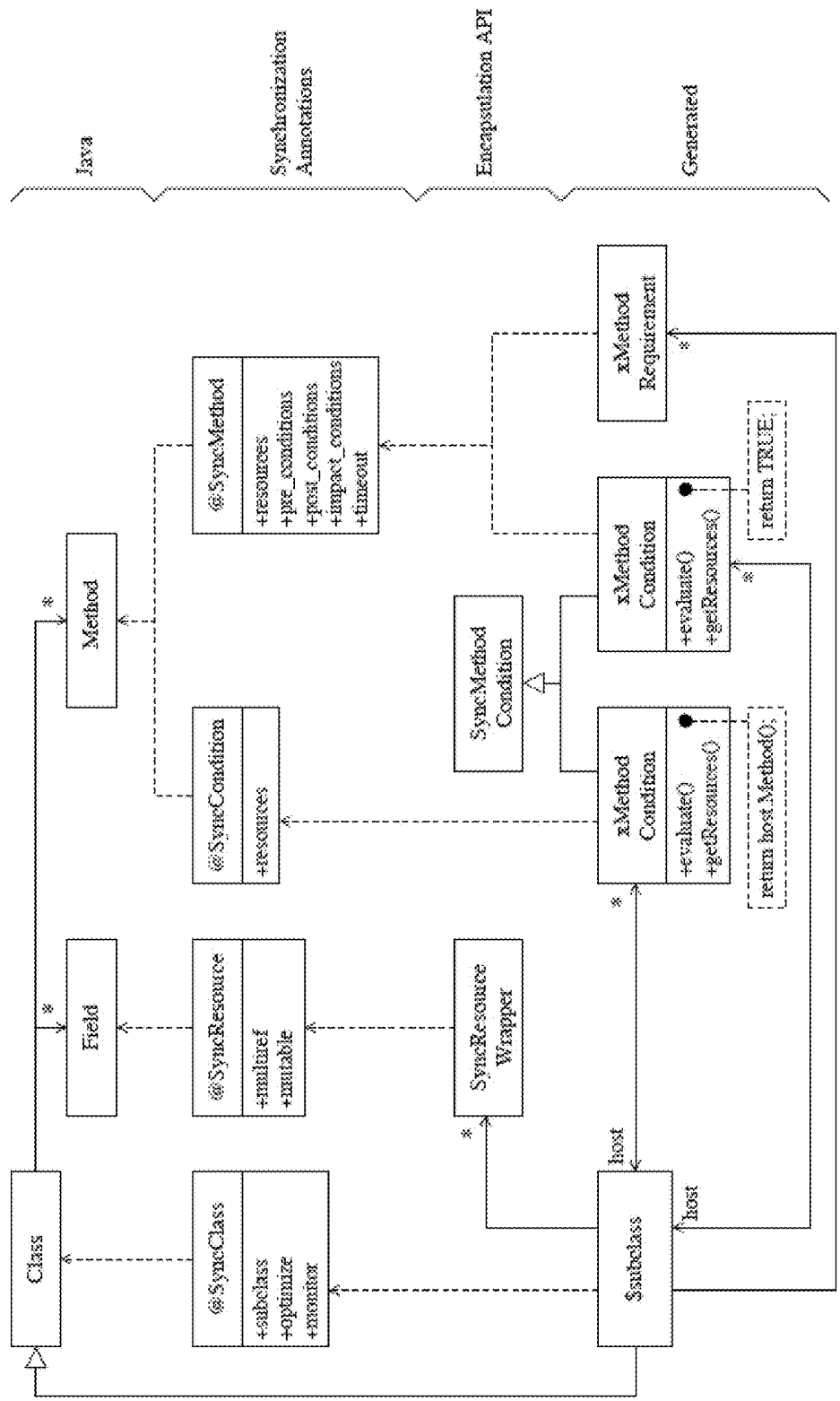
FIG. 5 illustrates a class diagram showing an overview of various processing layers involved during compilation of an annotated source file, in one embodiment of the invention.

FIG. 5 illustrates an overview of an exemplary approach, such as generative approach, that leverages the standard Java annotation mechanism to automatically generate the synchronization code from the sync logic used to specify annotation in the source file, in one embodiment of the invention. As illustrated, the overall process can be better understood by partitioning it into four logical layers, as indicated by the brackets in the right side of the figure. The functional logic in the source file is implemented as a set of Java classes using conventional Java language. This is illustrated by the top layer in FIG. 5. For each class that needs synchronization, annotations are provided using sync annotations, as illustrated by the second layer in FIG. 5. Sync annotations describe the sync requirement for each method of the class, including what resources are needed to execute the method and what conditions the method expects to hold true before being executed. At compile time, the compiler, such as Java compiler, invokes a sync annotation processor (SAP) to automatically translate the sync annotations into a set of classes by generating sync code for the sync annotations and then translating the sync code to generate a set of classes, as illustrated in the bottom layer of FIG. 5. The SAP uses one or more APIs to perform the translation. For instance, the SAP may use encapsulation API that is illustrated in the third layer to encapsulate the inherited methods with the sync code that automatically synchronizes multiple threads as the multiple threads invoke the methods. The generated classes are compiled automatically into class files by a compiler. These class files can be executed within any JVM with a prepackaged component that implements a sync service. The role of the sync service was previously described with reference to FIG. 2b.

Java provides the required toolkit to support custom annotations for use in the source code of the source file. Sync annotations are simply Java custom annotations. In one embodiment, the sync annotation comprises a name (prefixed by symbol "@") and a set of properties. According to the convention of Java annotation mechanism, an annotation is an identifier prefixed by symbol "@". The current embodiments use four types of synchronization annotations.

TABLE 1

| | Applies | Specifies |
|---|---|---|
| @SyncClass | class | configuration of code generation |
| @SyncResource | variable | interface |
| @SyncCondition | method | interface and synchronization requirement |
| @SyncMethod | method | synchronization requirement |

Table 4.1 illustrates their overall usage. @SyncClass applies to an entire Java class. This annotation specifies the configuration that the compiler plugin uses in generating code. @SyncResource applies to a class variable. @SyncCondition and @SyncMethod apply to a class method.

The following sample code illustrates an exemplary usage of the four different types of annotations as they are applied to different elements of a Java class in the source file. The different types of annotations serve different purposes of specification.

```
Sample code:
1    @SyncClass (subclass = "BallRoomSync")
     abstract public class Ballroom {
3      @Sync Resource
       protected Queue<Person>  boys = new LinkedList <Person>( );
5
       @SyncResource
7      protected Queue<Person>  girls = new LinkedList <Person>( );
9      static public  BallRoom  instance ( ) {
       return new BallRoomSync ( );
11     }
13     @SyncCondition ( resources = { "boys" })
       public boolean hasBoys( ) {
15        return boys . size ( ) > 0;
       }
```

```
Sample code:
-continued
17
       @SyncCondition ( resources = { "girls" })
19     public boolean hasGirls( ) {
          return girls . size ( ) > 0;
21     }
23     @SyncMethod( resources = { "boys" , "girls" },
                   pre_conditions = { "hasBoys" , "hasGirls" })
25     public void pair ( ) {
          boys . remove ( );
27        girls . remove ( );
       }
29
       @SyncMethod( resources = { "boys" },
31                 impact_conditions = { " hasBoys " })
       public void addBoy ( Person boy ) {
33        boys . add (boy);
       }
35
       @SyncMethod( resources = {"girls"},
37                 impact_conditions = { "hasGirls" })
       public void addGirl ( Person girl ) {
39        girls . add (girl);
       }
41 }
```

@SyncClass (in line 1) indicates to the Java compiler that a class contains sync annotations and needs to be processed by a SAP. In the above sample code, the name of the class is "BallRoom". The @SyncClass applies to an entire Java class and thus is generally placed before the beginning of the class declaration.

@SyncResource (in lines 3 and 6) indicates to the SAP that the queues referenced by resources are shared by multiple threads. In the aforementioned sample code, the resources are represented by fields, boys and girls. The @SyncResource applies to a class variable.

@SyncCondition (lines 13 and 18) indicates to the SAP that the conditions encapsulate the boolean expressions that are used to describe condition synchronization. In the sample code, the sync conditions are represented as hasBoys( ) and hasGirls( )

@SyncMethod (lines 23, 30 and 36) indicates to the SAP that the methods encapsulate the procedural code that needs to be synchronized. In the sample code the methods are represented by pair( ) addBoy( . . . ), and addGirl( . . . ).

The @SyncCondition and @SyncMethod apply to a class method. Since class methods encapsulate the functional logic, the two annotations (@SyncCondition and @SyncMethod) also specify the sync requirement for invoking the annotated methods. Further, @SyncCondition and @SyncResource define the interface between the separated logic, because they annotate the class elements (i.e. variables and methods) that can be referenced in the specification of the sync requirement.

It can be observed from the aforementioned sample code that there is no low-level synchronization primitives used, such as acquiring a lock, releasing a lock, waiting or notifying. Instead, the sync logic is specified on a fairly high level using the annotations. Since the annotations do not mix inside Java methods, the functional logic and the sync logic are cleanly separated. As a result, Java methods encapsulate only the functional logic; annotations encapsulate only the synchronization logic.

During processing of the annotations, the SAPs ensure proper usage of the sync annotations. @SynClass applies to an abstract class. In order to permit subclassing, this class is declared without using the keyword 'final'. Due to the abstract keyword, a sync class avoids direct instantiation of itself in application. As the sync class does not contain any sync details, directly executing methods on its instances can lead to data races. As the SAP generates the sync details in a subclass, the application uses the subclass instead. @SyncResource and @SyncCondition are respectively used to annotate the fields and the methods in a sync class. These fields and methods must be defined such that they are inheritable for the subclass to use them. Additionally, the methods include restrictions, such as returning Boolean values, and must be free of exceptions in order to ensure that executing these methods do not introduce any side-effect. In the aforementioned sample code, the fields are referred as sync resources and the methods as sync conditions. @SyncMethod also applies to methods of a sync class but without the restrictions provided in the sync conditions on the kinds of methods that can be annotated using this annotation. The methods that @SyncMethod annotates can return any data types, including void, and throw exceptions. Since the subclass wraps these methods, the methods must be overrideable.

Referring to the aforementioned sample code, the class Ballroom is a valid sync class, because it is abstract and not final. The name of the subclass that the SAP will generate for this class is BallRoomSync (line 1). "boys" and "girls" are valid sync resources and the objects that these resources reference are mutable and not multi-referenced. Thus, the @SyncResource annotations (lines 3 and 6) use the default values for their properties. Methods hasBoys( ) and hasGirls( )) are introduced to encapsulate conditions for describing the requirements of condition synchronization in this class. These methods are valid sync conditions, since they are public, return Boolean values and do not throw exceptions. The resource property of these sync conditions refer to the sync resource used in the methods (lines 13 and 18). Methods pair( ), addBoy( . . . ) and addGirl( . . . ) encapsulate the functional logic and are essentially the same as those used in the conventional implementation using locks. These methods are valid sync methods, because they are public. The first method pair( ) has two preconditions (line 24), which include the sync conditions defined earlier. These preconditions ensure that a boy and a girl are paired only when unpaired boys and girls exist. The method pair( ) declares boys and girls in its resources since this method removes elements from both resource queues (line 23). Methods addBoy( . . . ) and addGirl( . . . ) can change the respective conditions hasBoys( ) and hasGirls( ) by adding more elements to the queues.

The code generated by the SAP highlights the sync requirements specified in the sync annotations. The SAP enforces proper usage of the synch annotations. Thus, before the SAP generates any code, it checks for any misuses of the sync annotations. If the SAP detects a serious misuse that prevents it from proceeding, the SAP halts the compilation process. Alternately, if the SAP detects a misuse that is not serious enough, the SAP records the misuse as a warning and continues compiling the sync annotations. Some of the serious misuses may include undefined sync resources, undefined sync conditions, improperly defined sync classes, improperly defined sync resources, improperly defined sync conditions, improperly defined sync methods, missing a factory method, and non-deterministic post-conditions. Non-deterministic post-conditions may occur when, for a given sync method, the set of post-conditions require more sync resources than those required by the set of preconditions. This is a misuse, because the additional sync resources that are required by the post-conditions will not be protected by a thread executing that sync method. Consequently, the post conditions may be non-deterministic.

Non-serious misuses detected by the SAP that generate exemplary warnings include unused sync resources, unused sync conditions, unnecessary sync resources, condition loops, and orphan conditions. A sync resource is used unnecessarily when it appears in a monitor sync class. A condition loop occurs when two or more sync methods form a cycle of executability edges. An executability edge is defined as an arrow between two sync methods. As a condition loop can potentially lead to a deadlock, the SAP provides a warning message whenever such a loop is found in the sync annotation. Orphan case means that a sync condition is a precondition of some sync method but is not an impact condition of any sync method, or vice versa. This situation would be a misuse, because, for a sync condition to make sense, the sync condition has to be both a precondition and an impact condition.

When the SAP detects no serious misuses of sync annotations, the SAP begins to generate code. The SAP generates a set of codes to encapsulate the sync requirements specified using the sync annotations in addition to generating the sync sub class. Encapsulation codes are mapped to the sync annotations used in the source file. Each sync condition is represented by an encapsulation code. Each sync method also entails an encapsulation code. However, rather than representing the sync method, this encapsulation code is used to encapsulate the resources property of the @SyncMethod annotation applied to the sync method. The benefit of encapsulating the resources property in an encapsulation code is that the synchronization requirement of a sync method can be subsequently represented as a set of conditions so that the generated subclass can unify the handling of mutual exclusion with the handling of condition synchronization.

The subclass generated by the SAP manages instances of the encapsulation codes and wraps the sync methods with the code that automatically synchronizes threads as the threads execute the methods. A print out of a stack of exceptions, whenever they occur, is captured by the wrapped method. The SAP also generates code in the subclass to implement a flexible logging utility. This logging utility automatically keeps track of the thread activities and, during runtime, saves the tracking records in one or more log files. The format, size of the log file and other logging related configurations, when present, may be preset using a customizable configuration file.

Figure 6:
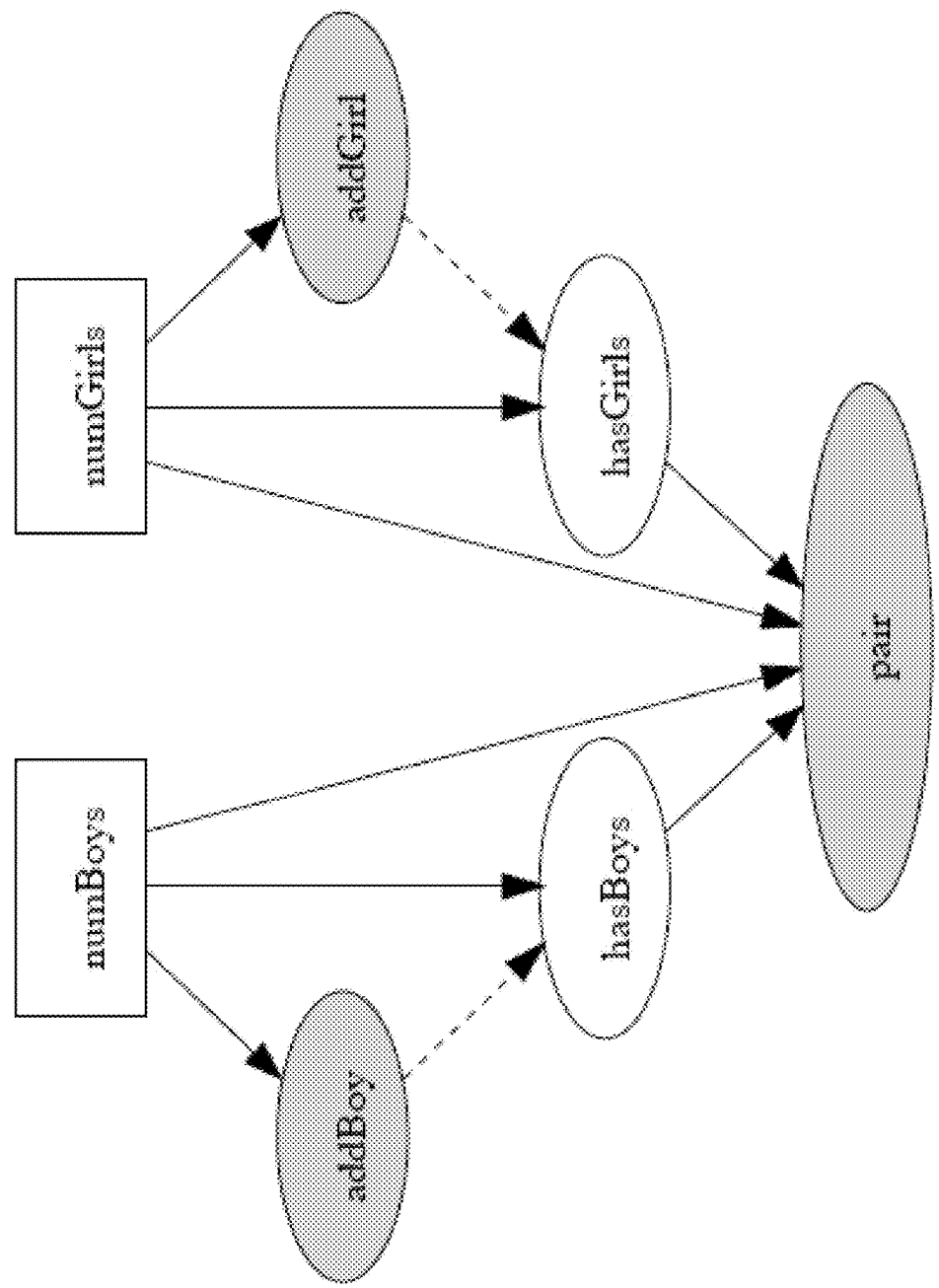
FIG. 6 illustrates a dependency graph for an exemplary application generated by a compiler during compilation of a source file, in one embodiment of the invention.

FIGS. 6-10 illustrate usage of a dependency graph by an annotation processor during compilation of the annotations. Internally, the annotation processor generates a high-level representation of the synchronization logic specified using synchronization annotations for a source file. Since this representation is similar to a directed graph, and since it signifies the dependency among program elements, the high-level representation is defined as a dependency graph. FIG. 6 illustrates the dependency graph generated for a sync class defined in the sample code above. A rectangle represents a sync resource, a clear ellipse represents a sync condition, a dark ellipse represents a sync method and an arrow represents a dependency.

Simply put, the dependency graph models a relationship between a source and a sink. A solid arrow represents a strong dependency, meaning that the sink requires the source. If the source is a sync resource, then the sink requires the resource to be available. If the source is a sync condition, then the sink requires the condition to be true. A sync method cannot be the source of a strong dependency. A broken arrow, on the other hand, represents a weak dependency. A weak dependency exists only from a sync method to a sync condition and indicates that the condition might become true after the method is executed.

Figure 7:
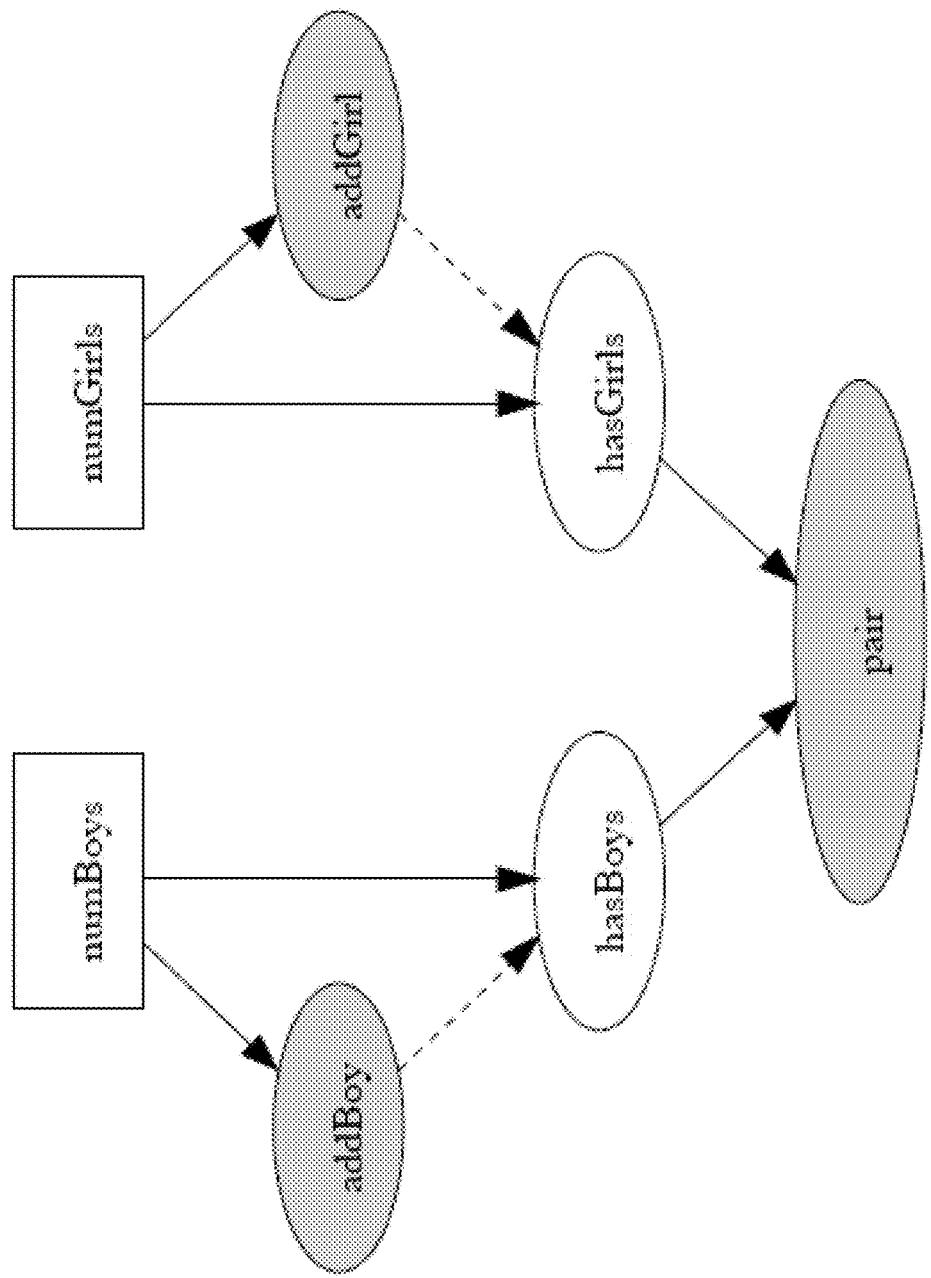
FIG. 7 illustrates a dependency graph for the application illustrated in FIG. 6 optimized for code, in one embodiment of the invention.

After generating the dependency graph, the generated code is optimized. This is done by simplifying a program's (i.e. application code with a source file) annotations by removing redundant dependencies. An optimized dependency graph is illustrated in FIG. 7. Starting from a sync method, the set of sync resources that are transitively backward-reachable along the strong dependencies represent the entire set of resources that a thread needs to use in executing the sync method. Consequently, there is no need to keep multiple paths from a sync resource to a sync method. By removing the additional paths, the sync annotations used in a program can be simplified. Thus, as illustrated in FIG. 7, two redundant dependencies, numBoys to pair and numGirls to pair, represented by solid arrows are removed from the dependency graph. This optimized dependency graph indicates that sync method pair does not need to give any value to property resources of its annotation @SyncMethod.

Figure 8:
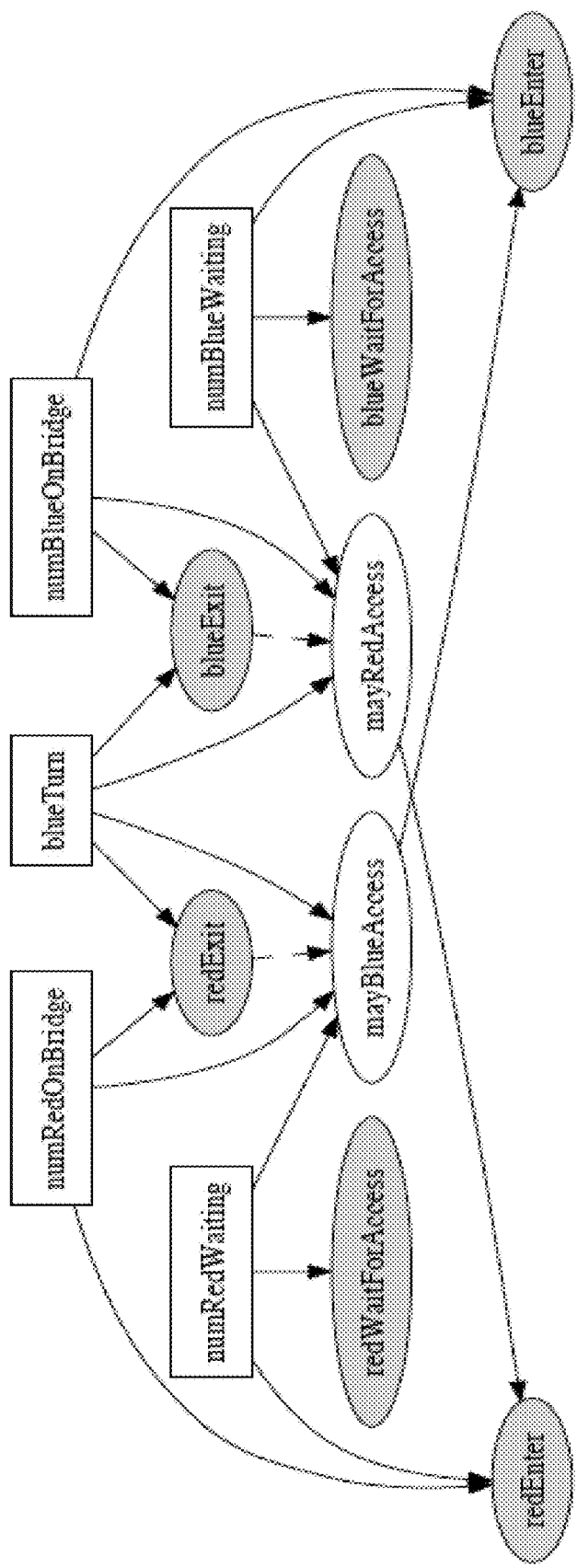
FIG. 8 illustrates a dependency graph for an exemplary application generated by a compiler, in one embodiment of the invention.
Figure 9:
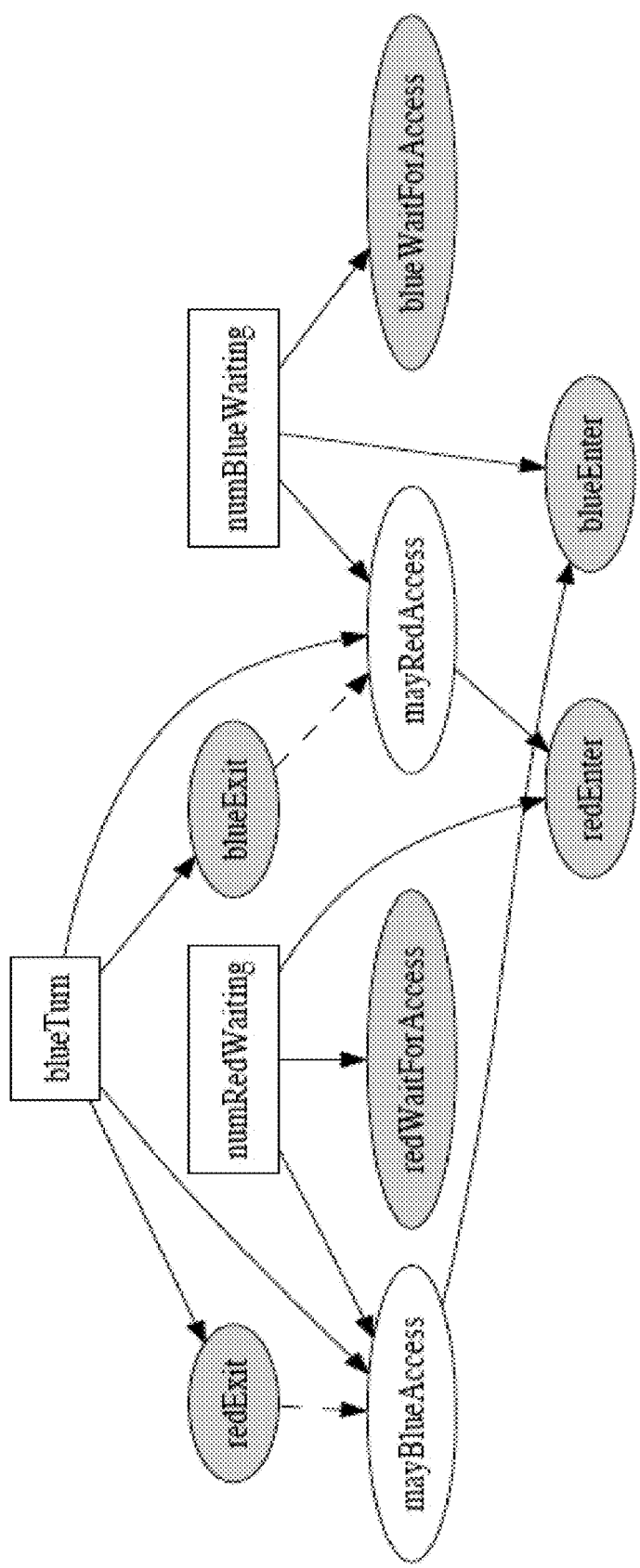
FIG. 9 illustrates a dependency graph for the application illustrated in FIG. 8 optimized for resources, in one embodiment of the invention.

Another optimization that is implemented by the annotation processor includes simplifying the generated code by minimizing the number of resources handled by the code. Sometimes, it is not necessary to use all the sync resources that are annotated in a sync class. Some resources are always needed at the same time by a sync method or a sync condition. In this case, these resources belong to the same equivalent class. Consequently, it suffices to elect only one resource from this class. For example, FIG. 8 illustrates the dependency graph of a class that implements a fair single-lane bridge application and FIG. 9 illustrates an optimized version of the dependency graph illustrated in FIG. 8. The optimized version illustrates elimination of two unnecessary resources numRedOnBridge and numBlueOnBridge. These resources are safe to remove during optimization because whenever they are needed by a sync method (i.e. redEnter, redExit, blueEnter or blueExit) or a sync condition (i.e., mayBlueAccess or mayRedAccess) the sync resource blueTurn is also needed.

Figure 10:
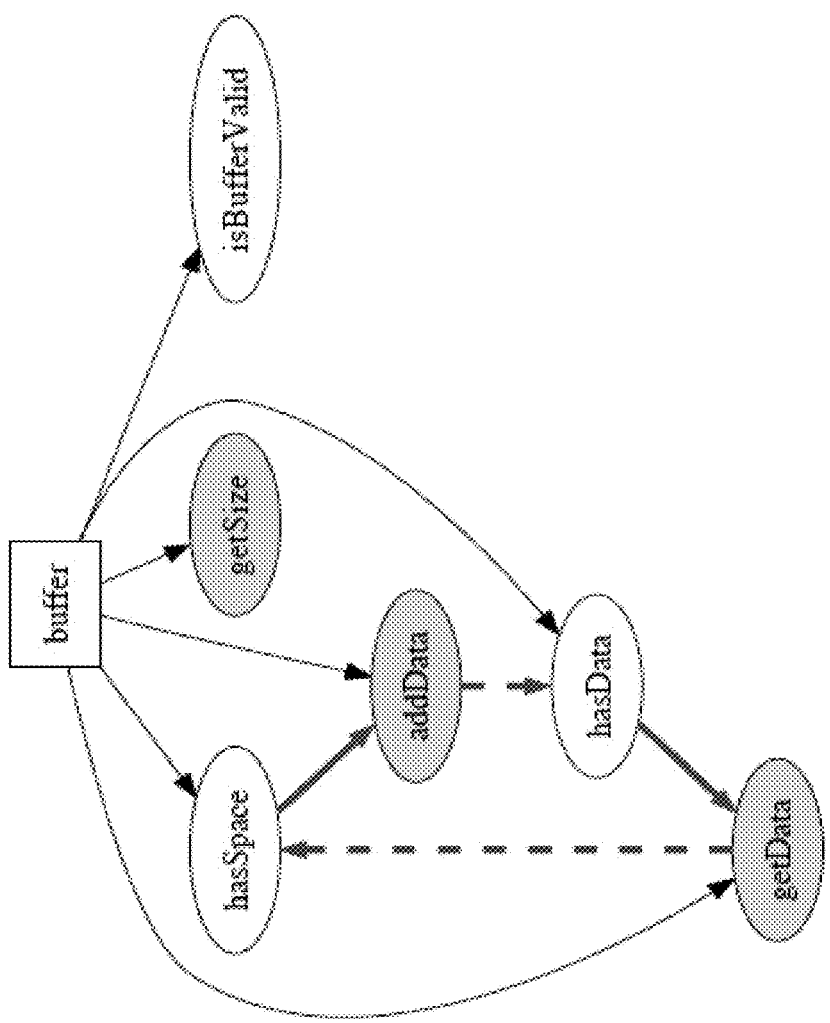
FIG. 10 illustrates a dependency graph of a class implementing a bounded buffer, in one embodiment of the invention.

When the annotation processor generates a dependency graph, the annotation processor automatically highlights the cycles detected in the graph. These cycles alert of potential deadlocks and potential misuse. FIG. 10 illustrates a dependency graph of a class that implements bounded buffer. Two multiple threads invoking addData and getData, respectively, may endlessly wait for each other, if conditions hasSpace and hasData are false at the same time. The only situation when these conditions can be false at the same time is when the buffer size is 0. Although value 0 is not typical for a buffer, this potential deadlock cycle may be something that can be easily overlooked when defining sync annotations. In order to avoid such oversight and avert potential deadlock, a meaningful value range can be enforced for the buffer.

The dependency graph may be designed upfront using a graphical editor within the annotation processor. The graphical editor aids in the automatic generation of Java code that embeds the optimized sync annotations using the dependency graph. The graphical editor also permits creation and filling of procedural code using the same graphical interface so that the generated code can be compiled instantaneously.

Figure 11:
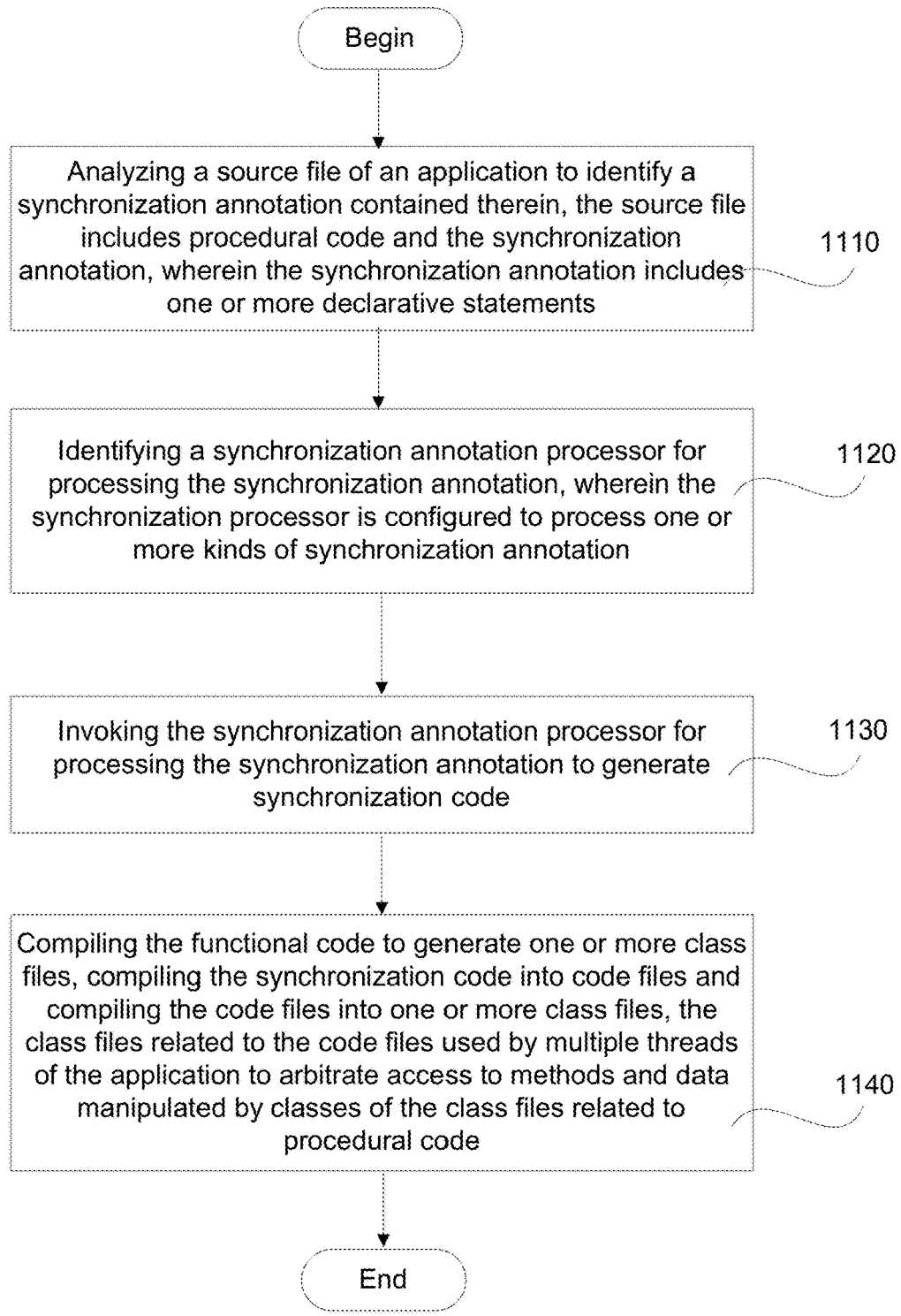
FIG. 11 illustrates a flowchart of operations used by a method for providing synchronization of a multi-threaded application executing on multiple threads, in one embodiment of the invention.

With the above detailed description of various embodiments for processing synchronization annotations, methods for processing synch annotations will now be described with reference to FIGS. 11 and 12. Referring now to FIG. 11, the method begins at operation 1110, wherein a source file of an application used in multi-threaded programming, is analyzed to identify a synchronization annotation defined within the source file. The source file includes procedural code and the sync annotation, wherein the sync annotation is defined using high-level declarative statements. A compiler called to compile the program analyzes the code within the source file and identifies the high-level declarative statements defined in the source file. The compiler may use one or more modules, such as scanner, parser, and enter modules, to generate one or more syntax trees and use the syntax trees for the analysis. Alternatively, the compiler may examine the source code, identify the declaratives, and collect information related to the declaratives. The compiler then identifies a synchronization annotation processor (SAP) to process the sync annotation, as illustrated in operation 1120. The compiler may identify appropriate SAP based on the sync logic defined in the sync annotation. The SAP is designed to process one or more kinds of sync annotations. The compiler then invokes the identified SAPs and hands over the processing of the sync annotations to the identified SAPs, as illustrated in operation 1130. The SAPs use Java toolkits, such as JavaProcessingEnvironment, to verify appropriateness of the sync annotations, ensure that there are no misuses of sync annotations prior to processing the sync annotations to generate the sync code. The generated sync code is returned to the compiler for further processing into class files. If the sync code includes additional annotations or refers to class files, the compiler either identifies and invokes additional SAPs to process the additional annotations or processes the class file along with the procedural code of the source file. The process concludes with the compiler compiling the procedural code of the source files into class files and the generated code received from the SAPs into class files, as illustrated in operation 1140. The generated class files encapsulate the sync requirements of the sync annotations specified for various methods within the source file, so that the threads can utilize the sync code during execution. The compiler links the class files associated with the code files and the procedural code together so that class files associated with the code files are used by multiple threads during execution of the multi-threaded application to arbitrate access to methods and data manipulated by classes within the class files associated with the procedural code. Upon successful compilation of the source file, the syntax tree, any bytecode generated during the processing of the sync annotations and/or collected information may be nulled so that the memory can be recovered by a garbage collector.

Figure 12:
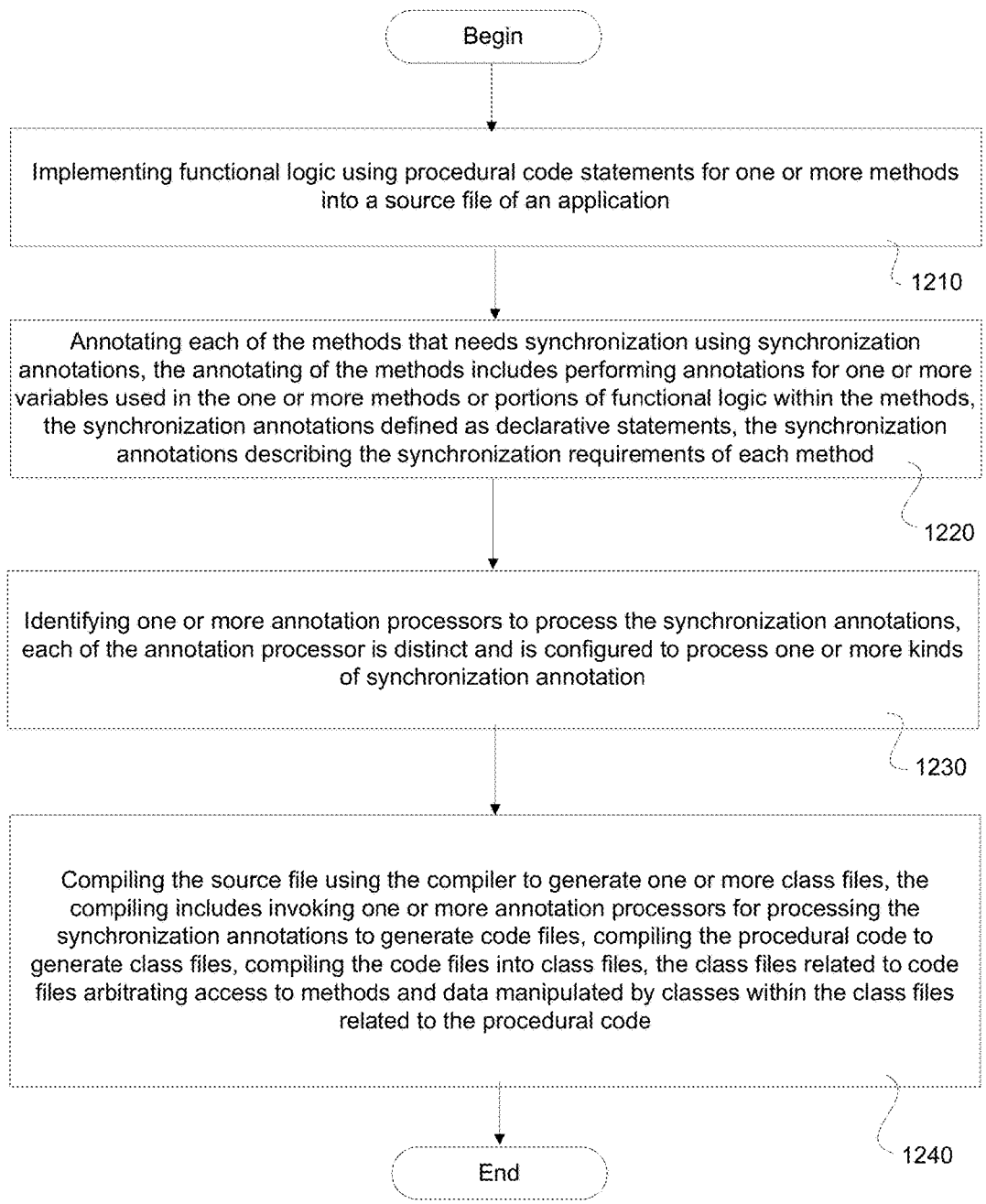
FIG. 12 illustrates a flowchart of operations used by a method for providing synchronization of a multi-threaded application executing on multiple threads, in an alternate embodiment of the invention.

FIG. 12 illustrates an alternate embodiment of the method for processing sync annotations. The method begins with operation 1210, wherein functional logic to perform one or more methods is implemented into a source file of a multi-threaded application. One or more methods are identified for synchronization. The identified methods are annotated using sync annotations, as illustrated in operation 1220. The sync annotations are defined as declarative statements. The sync annotations describe the sync requirements of each method that is defined using sync logic. The sync annotations are performed for one or more variables used in the one or more methods or for portions of the functional logic within the methods. One or more annotation processors are generated to process the sync annotations, as illustrated in operation 1230. Each annotation processor is distinct and is configured to process one or more kinds of sync annotation.

The source file is then subjected to compilation using a compiler in order to generate one or more class files, as illustrated in operation 1240. The compiling of the source file invokes one or more of the generated annotation processors to process the sync annotations. The SAPs process the annotations to generate code files, which are returned to the compiler for further processing. The compiler determines if additional annotations are available within the generated code files. If there are additional annotations, then those annotations are further processed by identifying additional SAPs that may be distinct from the ones that were used in the initial processing round. Upon completion of the processing by the SAPs, the compiler gathers all the generated code from the various SAPs and generates class files from the generated code files. The compiler also generates class files for all the procedural code within the source file. The class files related to code files are used by multiple threads during the execution of the multiple threaded application to arbitrate access to methods and data manipulated by the classes within the class files related to the procedural code.

The current embodiments thus describe an alternate way to process sync annotations by keeping the functional logic separate from the sync logic. The separation enables implementation of the functional logic and synchronization logic independently at different levels of abstraction. The functional logic tends to be operational and low-level. The synchronization annotations are defined using Java annotation technique which is high-level and declarative. Using the high-level declaratives, it is easier to develop various synchronization strategies without changing the procedural code and vice versa, making this a more flexible and optimized solution. The compiler is used to glue the functional logic and the synchronization logic together at compile time. The high-level declarative statements precisely capture a programmer's intention leaving the compiler to manage translation of the high-level declaratives to low-level machine-compatible code. Other advantages will become apparent to one skilled in the art after reading the description and the attached claims.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing synchronization of a multi-threaded application, comprising:

analyzing a source file of the application to identify a synchronization annotation contained therein, the source file including procedural code of the application and the synchronization annotation defined for the procedural code, wherein the synchronization annotation includes one or more declarative statements that are different from procedural statements implementing business logic within the procedural code;

identifying a synchronization annotation processor for processing the synchronization annotation identified in the source file separately from the procedural code of the source file, wherein the synchronization annotation processor is configured to process one or more kinds of synchronization annotation;

invoking the synchronization annotation processor for processing the synchronization annotation to generate one or more code files; and compiling the source file using a compiler to generate one or more class files, wherein the compiling includes, compiling the procedural code within the source file to generate corresponding one or more class files for the procedural code;

compiling the one or more code files of the synchronization annotation into corresponding one or more class files for the code files, wherein the class files for the code files are maintained separately from the class files for the procedural code and are linked during compile time, the linking enables the class files associated with the one or more code files to use a synchronization service via an application programming interface (API), during execution of the multi-threaded application, to provide arbitration by coordinating activities of multiple threads to methods and data manipulated by classes within the class files associated with the procedural code, the maintaining of the class files for the procedural code separately from the class files for the synchronization annotation allow implementation of different synchronization strategies without requiring changes to the procedural code or the synchronization annotation.

2. The method of claim 1, wherein the analyzing of the source file further includes, examining the source file to identify declarations contained therein;

collecting information related to the declarations, wherein the information identifies attributes of the declarations; and analyzing the synchronization annotation encountered in the source file using the collected information related to the declarations, the analysis of the synchronization annotation identifying attributes that are used to determine the appropriate synchronization annotation processor for processing the synchronization annotation.

3. The method of claim 1, wherein the class files generated from the code files define attributes of the synchronization annotation identified in the source file, wherein the attributes are used to implement an intent of the synchronization annotation.

4. The method of claim 1, wherein processing the synchronization annotation further includes, identifying one or more additional synchronization annotations within the code files generated by the synchronization annotation processor; and processing the one or more additional synchronization annotations contained within the code files using one or more synchronization annotation processors to generate one or more code files, the processing being recursive till the generated code files are annotations-free, wherein the code files are compiled into one or more class files, the one or more synchronization annotation processors used for processing additional synchronization annotations being same or different from the synchronization annotation processor used to process the synchronization annotations in the source file.

5. The method of claim 1, wherein the procedural code is written in Java language and the declarative statements of the synchronization annotation are written as Java annotations.

6. The method of claim 2, wherein compiling the source file further includes, obtaining collected information related to the declarations that are required for successful compilation of the procedural code in the source file; and generating one or more class files for the procedural code within the source file using the collected information related to the declarations, wherein the class files associated with the procedural code and the class files associated with the synchronization code work together, during execution, in providing synchronization of methods and data manipulation for a multi-threaded program.

7. A computing system having a processor and memory for providing synchronization of a multi-threaded application, the computing system comprising:

a compiler configured to analyze a source file of the application to identify one or more synchronization annotations contained therein, the source file including procedural code and the synchronization annotations defined for the procedural code, the synchronization annotations include one or more declarative statements that are different from procedural statements implementing business logic within the procedural code, the compiler further configured to examine the source file to identify declarations contained therein;

collect information related to the declarations, wherein the collected information identifies attributes of the declarations;

analyze the synchronization annotations encountered in the source file using the collected information related to the declarations, the analysis of the synchronization annotations identifying attributes that are used to determine appropriate synchronization annotation processors for processing the synchronization annotations;

a plurality of synchronization annotation processors communicatively connected to the compiler and configured to process the synchronization annotations identified in the source file separately from the procedural code of the source file and generate one or more code files, in response to invoking of the plurality of synchronization annotation processors by the compiler, wherein each of the plurality of synchronization annotation processors is configured to process one or more kinds of synchronization annotations, the generated code files returned to the compiler, wherein the compiler is configured to, compile the procedural code of the source file to generate corresponding one or more class files for the procedural code, compile the code files of the synchronization annotations to generate corresponding one or more class files for the code files, wherein the class files associated with the procedural code and the class files associated with the code files are maintained separately and linked during compile time, the linking enables the class files associated with the one or more code files to use a synchronization service via an application programming interface (API), during execution of the multi-threaded application, to provide arbitration by coordinating activities of multiple threads to methods and data manipulated by classes within the class files associated with the procedural code, the maintaining of the class files for the procedural code separately from the class files for the synchronization annotation allow re-using the procedural code or the synchronization annotation to implement different synchronization strategies without requiring changes to the procedural code or the synchronization annotation.

8. The system of claim 7, wherein the code generated by the synchronization annotation processor includes one or more additional synchronization annotations that are further processed by one or more of the synchronization annotation processors that are same or different from the synchronization annotation processor that processed the synchronization annotations in the source file.

9. A method for providing synchronization of a multi-threaded application, comprising:

implementing functional logic using procedural code statements for one or more methods into a source file of the application;

annotating each of the methods that needs synchronization using synchronization annotations, wherein the annotating of the methods includes performing annotations for one or more variables used in the one or more methods or for one or more portions of the functional logic within the one or more methods, the synchronization annotations defined as declarative statements that are different from procedural code statements of the functional logic within the one or more methods in the source file, the synchronization annotations describing synchronization requirements of each method;

identifying one or more annotation processors to process the synchronization annotations separately from the procedural code statements of the source file, wherein each of the one or more annotation processors is distinct and is configured to process one or more kinds of synchronization annotation; and compiling the source file using a compiler to generate one or more class files, the compiling includes, invoking the one or more annotation processors for processing the synchronization annotations contained within the source file to generate synchronization code that includes one or more code files encapsulating the synchronization requirements specified for each method;

compiling the procedural code statements within the one or more methods to generate a corresponding set of class files for the procedural code; and compiling the one or more code files of the synchronization code to generate the corresponding one or more class files for the code files, wherein the class files associated with the code files are maintained separately from the class files for the procedural code and are linked during compile time, the linking enables the class files associated with the one or more code files to use a synchronization service via an application programming interface (API), during execution of the multi-threaded application to provide arbitration by coordinating activities of multiple threads to methods and data manipulated by classes within the class files associated with the procedural code, the maintaining of the class files for the procedural code separately from the class files for the synchronization annotation allow implementation of different synchronization strategies without requiring changes to the procedural code or the synchronization annotation.

10. The method of claim 9, wherein each annotation processor is configured to process one or more particular synchronization annotations.

11. The method of claim 9, further including, mapping a corresponding code file to the respective one or more synchronization annotations used in the source file.

12. The method of claim 9, wherein compiling further includes, parsing the synchronization annotations, using the one or more annotation processors, to determine if there are any misuses of the synchronization annotations;

when no misuse of the synchronization annotations is detected by the annotation processors, generating the synchronization code for the one or more synchronization annotations.

13. The method of claim 12, wherein when a misuse of the synchronization annotations is detected by the one or more annotation processors, generating an error message for the misuse based on a severity of the misuse; and abandoning the compiling of the source file based on the severity of the misuse, wherein the abandoning includes abandoning generation of the code files for the one or more synchronization annotations, and class files for the code files.

14. The method of claim 12, wherein when a misuse of the synchronization annotations is detected by the annotation processors, generating a warning message for the misuse based on a severity of the misuse; and continuing compilation of the synchronization annotations to generate the synchronization code, the generated synchronization code is processed into code files, which are further used to compile class files.

\* \* \* \* \*

UNITED STATES PATENT AND TRADEMARK OFFICE
CERTIFICATE OF CORRECTION

PATENT NO. : 10,216,500 B2
APPLICATION NO. : 13/371383
DATED : February 26, 2019
INVENTOR(S) : Huang et al.

Page 1 of 1

It is certified that error appears in the above-identified patent and that said Letters Patent is hereby corrected as shown below:

In the Specification

In Column 1, Line 34, delete "multithreaded" and insert -- multi-threaded --, therefor.

In Column 2, Line 8, delete "implemented. procedural code" and insert -- implemented procedural code. --, therefor.

In Column 7, Line 11, delete "within. The compiler" and insert -- within the compiler. --, therefor.

In Column 12, Line 41, delete "hasGirls( )" and insert -- hasGirls( ). --, therefor.

In Column 12, Line 66, delete "@SynClass" and insert -- @SyncClass --, therefor.

In Column 13, Line 31, delete "Girls( ))" and insert -- Girls( ) --, therefor.

Signed and Sealed this
Twenty-eighth Day of January, 2020

Andrei Iancu
*Director of the United States Patent and Trademark Office*